United States Patent
Hayashi et al.

(10) Patent No.: US 11,796,012 B2
(45) Date of Patent: Oct. 24, 2023

(54) CLUTCH DEVICE

(71) Applicant: DENSO CORPORATION, Kariya (JP)

(72) Inventors: Souichirou Hayashi, Kariya (JP); Takumi Sugiura, Kariya (JP); Akira Takagi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/582,593

(22) Filed: Jan. 24, 2022

(65) Prior Publication Data

US 2022/0145942 A1 May 12, 2022

Related U.S. Application Data

(63) Continuation of application No. PCT/JP2020/028597, filed on Jul. 23, 2020.

(30) Foreign Application Priority Data

Jul. 26, 2019 (JP) .................................. 2019-138331
Feb. 28, 2020 (JP) .................................. 2020-033760

(51) Int. Cl.
*F16D 23/12* (2006.01)
*F16D 13/58* (2006.01)
(Continued)

(52) U.S. Cl.
CPC .............. *F16D 23/12* (2013.01); *F16D 13/58* (2013.01); *F16H 37/124* (2013.01); *H02K 7/108* (2013.01);
(Continued)

(58) Field of Classification Search
CPC ........................ F16D 2023/123; F16D 37/124
See application file for complete search history.

(56) References Cited

U.S. PATENT DOCUMENTS 4,976,347 A * 12/1990 Sakakibara ............. F16D 28/00
  192/93 A
5,910,061 A * 6/1999 Organek ................ F16D 27/112
  192/93 A
(Continued)

FOREIGN PATENT DOCUMENTS

WO   WO-2012159598 A1 * 11/2012 ............. B60K 6/387
WO   2021/020312        2/2021
(Continued)

OTHER PUBLICATIONS

Machine translation of WO201259598, retrieved from espacenet.com (Year: 2023).*

(Continued)

*Primary Examiner* — Stacey A Fluhart
(74) *Attorney, Agent, or Firm* — Nixon & Vanderhye P.C.

(57) ABSTRACT

A state changing unit is provided radially outward of a translation portion and movable in an axial direction relative to the translation portion. The state changing unit is in contact with or separated from the clutch. The state changing unit receives a force in the axial direction from the translation portion such that the state changing unit is pressed against the clutch. The state changing unit is capable of changing a state of the clutch to an engaged state or a disengaged state according to a position of the translation portion in the axial direction relative to the housing. A movement restriction portion is provided on the translation portion and located between the state changing unit and the clutch. The movement restriction portion contacts the state changing unit and restricts movement of the state changing unit relative to the translation portion toward the clutch.

11 Claims, 7 Drawing Sheets

(51) Int. Cl.
*F16H 37/12* (2006.01)
*H02K 7/108* (2006.01)
*H02K 7/116* (2006.01)
*F16D 13/52* (2006.01)
*F16D 125/36* (2012.01)
*F16D 125/50* (2012.01)

(52) U.S. Cl.
CPC .............. *H02K 7/116* (2013.01); *F16D 13/52* (2013.01); *F16D 2023/123* (2013.01); *F16D 2125/36* (2013.01); *F16D 2125/50* (2013.01)

(56) References Cited

U.S. PATENT DOCUMENTS

| | | | | |
|---|---|---|---|---|
| 6,951,521 | B2* | 10/2005 | Hakui | F16H 63/3043 192/84.6 |
| 2004/0112702 | A1* | 6/2004 | Stevenson | F16D 28/00 192/70.23 |
| 2004/0116230 | A1* | 6/2004 | Hakui | F16D 28/00 475/149 |
| 2005/0205377 | A1* | 9/2005 | Borgerson | F16D 28/00 192/48.92 |
| 2005/0230217 | A1* | 10/2005 | Kelley | F16D 23/12 192/84.6 |
| 2010/0000835 | A1* | 1/2010 | Connolly | F16D 28/00 192/31 |
| 2016/0193915 | A1* | 7/2016 | Cooper | B60K 23/04 475/220 |
| 2016/0238107 | A1 | 8/2016 | Hirota et al. | |

FOREIGN PATENT DOCUMENTS

| | | |
|---|---|---|
| WO | 2021/020313 | 2/2021 |
| WO | 2021/020314 | 2/2021 |
| WO | 2021/020315 | 2/2021 |
| WO | 2021/020317 | 2/2021 |
| WO | 2021/020318 | 2/2021 |
| WO | 2021/020319 | 2/2021 |
| WO | 2021/020320 | 2/2021 |
| WO | 2021/020321 | 2/2021 |

OTHER PUBLICATIONS

U.S. Appl. No. 17/582,482 to Akira Takagi, filed Jan. 24, 2022 (62 pages).
U.S. Appl. No. 17/571,165 to Akikazu Uchida, filed Jan. 7, 2022 (61 pages).
U.S. Appl. No. 17/582,754 to Akikazu Uchida, filed Jan. 24, 2022 (44 pages).
U.S. Appl. No. 17/576,394 to Souichirou Hayashi, filed Jan. 14, 2022 (51 pages).
U.S. Appl. No. 17/582,899 to Takumi Sugiura, filed Jan. 24, 2022 (67 pages).
U.S. Appl. No. 17/583,725 to Ryo Ishibashi, filed Jan. 25, 2022 (57 pages).
U.S. Appl. No. 17/582,949 to Ryo Ishibashi, filed Jan. 24, 2022 (44 pages).
U.S. Appl. No. 17/582,410 to Takumi Sugiura, filed Jan. 24, 2022 (67 pages).
U.S. Appl. No. 17/582,780 to Takumi Sugiura, filed Jan. 24, 2022 (41 pages).
U.S. Appl. No. 17/582,482, filed Jan. 24, 2022, Clutch Device.
U.S. Appl. No. 17/571,165, filed Jan. 7, 2022, Clutch Device.
U.S. Appl. No. 17/582,754, filed Jan. 24, 2022, Clutch Device.
U.S. Appl. No. 17/576,394, filed Jan. 14, 2022, Clutch Device.
U.S. Appl. No. 17/582,899, filed Jan. 24, 2022, Clutch Device.
U.S. Appl. No. 17/583,725, filed Jan. 25, 2022, Clutch Device.
U.S. Appl. No. 17/582,949, filed Jan. 24, 2022, Clutch Device.
U.S. Appl. No. 17/582,410, filed Jan. 24, 2022, Clutch Device.
U.S. Appl. No. 17/582,780, filed Jan. 24, 2022, Clutch Device.

* cited by examiner

| INPUT/OUTPUT PATTERN | | | INERTIA MOMENT | REDUCTION RATIO |
|---|---|---|---|---|
| INPUT | OUTPUT | FIXED | | |
| S | D | C | MIDDLE | MIDDLE |
| S | C | D | MIDDLE | MIDDLE |
| C | D | S | LARGE | × (INCREASE) |
| C | S | D | LARGE | × (INCREASE) |
| D | S | C | LARGE | × (INCREASE) |
| D | C | S | LARGE | SMALL |

| INPUT/OUTPUT PATTERN | | | INERTIA MOMENT | REDUCTION RATIO |
|---|---|---|---|---|
| INPUT | OUTPUT | FIXED | | |
| A | D | C | SMALL | LARGE |
| A | C | D | SMALL | LARGE |
| C | D | A | LARGE | × (INCREASE) |
| C | A | D | LARGE | × (INCREASE) |
| D | A | C | LARGE | × (INCREASE) |
| D | C | A | LARGE | SMALL |

CLUTCH DEVICE

CROSS REFERENCE TO RELATED APPLICATIONS

The present application is a continuation application of International Patent Application No. PCT/JP2020/028597 filed on Jul. 23, 2020, which designated the U.S. and claims the benefit of priority from Japanese Patent Application No. 2019-138331 filed on Jul. 26, 2019, and Japanese Patent Application No. 2020-033760 filed on Feb. 28, 2020. The entire disclosures of all of the above applications are incorporated herein by reference.

TECHNICAL FIELD

The present disclosure relates to a clutch device.

BACKGROUND

Conventionally, there is known a clutch device that allows or interrupts transmission of torque between a first transmission portion and a second transmission portion by changing a state of a clutch to an engaged state or a disengaged state.

SUMMARY

A clutch device according to at least one embodiment includes a housing, a prime mover, a speed reducer, a rotational translation unit, a clutch, a state changing unit and a movement restriction portion. The prime mover is provided in the housing and capable of outputting torque. The speed reducer reduces torque of the prime mover and output the reduced torque.

The rotational translation unit includes a rotation portion that rotates relative to the housing upon receiving an input of the torque output from the speed reducer, and a translation portion that moves relative to the housing in an axial direction in accordance with rotation of the rotation portion relative to the housing.

The clutch is provided between a first transmission portion and a second transmission portion that are rotatable relative to the housing. The clutch allows transmission of torque between the first transmission portion and the second transmission portion in an engaged state of the clutch, and interrupts the transmission of torque between the first transmission portion and the second transmission portion in a disengaged state of the clutch.

The state changing unit is provided radially outward of the translation portion and movable in the axial direction relative to the translation portion. The state changing unit is movable in the axial direction relative to the housing such that the state changing unit is in contact with the clutch or separated from the clutch. The state changing unit receives a force along the axial direction from the translation portion such that the state changing unit is pressed against the clutch. The state changing unit changes a state of the clutch to the engaged state or the disengaged state according to a position of the translation portion in the axial direction relative to the housing.

The movement restriction portion is provided on the translation portion and located between the state changing unit and the clutch. The movement restriction portion restricts movement of the state changing unit toward the clutch relative to the translation portion by the movement restriction portion contacting the state changing unit.

BRIEF DESCRIPTION OF DRAWINGS

The details of one or more embodiments are set forth in the accompanying drawings and the description below. Other features and advantages will be apparent from the description and drawings, and from the claims. In the drawings:

DETAILED DESCRIPTION

Figure 1:
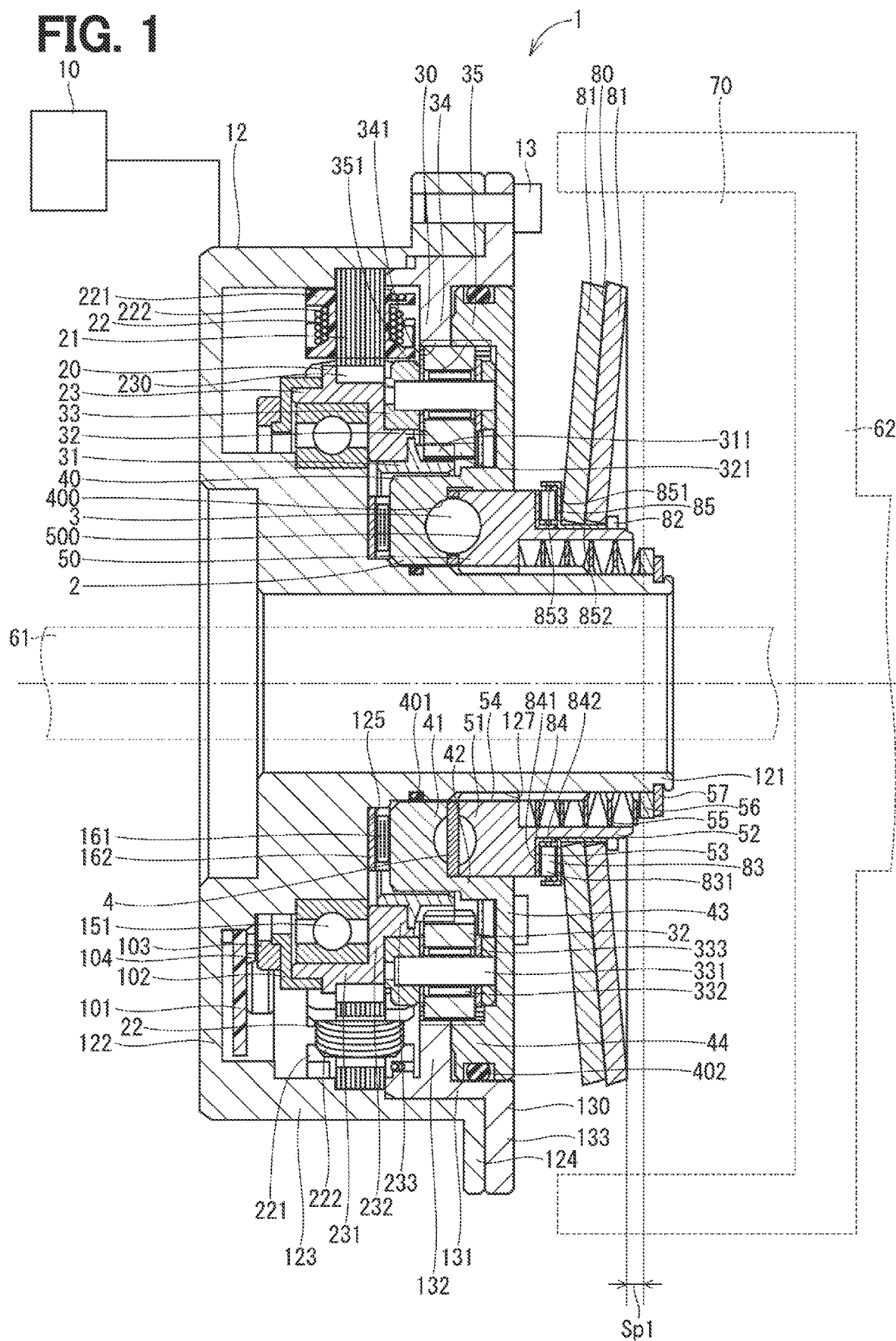
FIG. 1 is a cross-sectional view showing a clutch device according to an embodiment.

To begin with, examples of relevant techniques will be described.

A clutch device according to a comparative example includes a prime mover, a speed reducer, a rotational translation unit, a clutch, and a state changing unit. The prime mover outputs torque by being supplied with electric power. The speed reducer reduces the torque of the prime mover and outputs the reduced torque. The torque output from the speed reducer is input to the rotational translation unit. The state changing unit is capable of changing a state of the clutch to an engaged state or a disengaged state by receiving a force in an axial direction from the rotational translation unit.

In the clutch device, the state changing unit includes a disk spring that can come into contact with the clutch and is elastically deformable in an axial direction.

However, in the clutch device of the comparative example, movement of the disk spring of the state changing unit toward the clutch relative to a translation portion is not restricted. When the state of the clutch is shifted from the engaged state to the disengaged state by the translation portion moving in a direction away from the clutch, the disk spring may come into contact with the clutch. Therefore, the rotating clutch and the disk spring may slide on each other, and the clutch and the disk spring may be worn. Sliding between the clutch and the disk spring may cause drag loss.

In contrast, a clutch device according to the present disclosure includes a housing, a prime mover, a speed reducer, a rotational translation unit, a clutch, a state changing unit and a movement restriction portion. The prime mover is provided in the housing and capable of outputting torque. The speed reducer reduces torque of the prime mover and output the reduced torque.

The rotational translation unit includes a rotation portion that rotates relative to the housing upon receiving an input of the torque output from the speed reducer, and a translation portion that moves relative to the housing in an axial direction in accordance with rotation of the rotation portion relative to the housing.

The clutch is provided between a first transmission portion and a second transmission portion that are rotatable relative to the housing. The clutch allows transmission of torque between the first transmission portion and the second transmission portion in an engaged state of the clutch, and interrupts the transmission of torque between the first transmission portion and the second transmission portion in a disengaged state of the clutch.

The state changing unit is provided radially outward of the translation portion and movable in the axial direction relative to the translation portion. The state changing unit is movable in the axial direction relative to the housing such that the state changing unit is in contact with the clutch or separated from the clutch. The state changing unit receives a force along the axial direction from the translation portion such that the state changing unit is pressed against the clutch. The state changing unit changes a state of the clutch to the engaged state or the disengaged state according to a position of the translation portion in the axial direction relative to the housing.

The movement restriction portion is provided on the translation portion and located between the state changing unit and the clutch. The movement restriction portion restricts movement of the state changing unit toward the clutch relative to the translation portion by the movement restriction portion contacting the state changing unit. Therefore, when the state of the clutch is shifted from the engaged state to the disengaged state by the translation portion moving in the direction away from the clutch, the clutch and the state changing unit can be separated from each other by restricting the movement of the state changing unit toward the clutch by the movement restriction portion. Accordingly, sliding between the rotating clutch and the state changing unit can be reduced, and wear of the clutch and the state changing unit can be reduced.

Hereinafter, clutch devices according to multiple embodiments will be described referring to drawings. In these embodiments, elements that are substantially same may be assigned the same reference numeral, and redundant explanation for the elements may be omitted.

Embodiment

Figure 2:
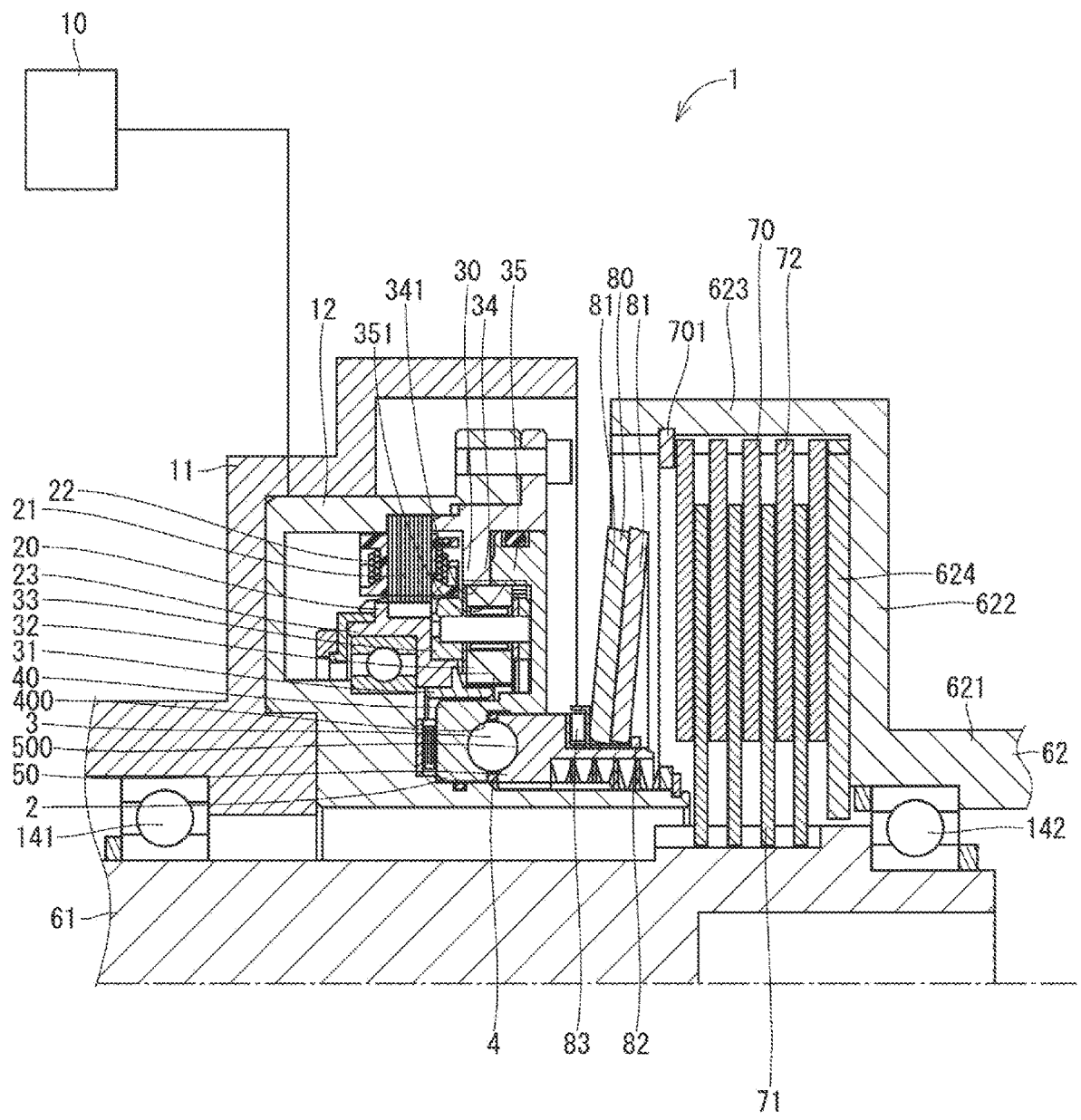
FIG. 2 is a cross-sectional view showing a part of a clutch device according to the embodiment.

A clutch device according to an embodiment is shown in FIGS. 1 and 2. A clutch device 1 is provided, for example, between an internal combustion engine and a transmission of a vehicle, and is used to allow or interrupt transmission of torque between the internal combustion engine and the transmission.

The clutch device 1 includes a housing 12, a motor 20 as a "prime mover", a speed reducer 30, a ball cam 2 as a "rotational translation unit", a clutch 70, a state changing unit 80, and a C ring 82 as a "movement restriction portion".

The clutch device 1 includes an electronic control unit (hereinafter referred to as "ECU") 10 as a "control unit", an input shaft 61 as a "first transmission portion", an output shaft 62 as a "second transmission portion", and a fixing portion 130.

The ECU 10 is a small computer including a CPU as a calculation means, a ROM, a RAM, and the like as storage means, an I/O as an input and output means, and the like. The ECU 10 executes calculation according to a program stored in the ROM or the like based on information such as signals from various sensors provided in each part of the vehicle, and controls operations of various devices and machines of the vehicle. In this way, the ECU 10 executes the program stored in a non-transitory tangible storage medium. With the execution of the program, a method corresponding to the program is executed.

The ECU 10 can control an operation of the internal combustion engine and the like based on the information such as the signals from various sensors. The ECU 10 can also control an operation of the motor 20 to be described later.

The input shaft 61 is connected to, for example, a drive shaft (not shown) of the internal combustion engine, and is rotatable together with the drive shaft. That is, torque is input to the input shaft 61 from the drive shaft.

The vehicle equipped with the internal combustion engine is provided with a fixing flange 11 (see FIG. 2). The fixing flange 11 is formed in a tubular shape, and is fixed to, for example, an engine compartment of the vehicle. A ball bearing 141 is provided between an inner peripheral wall of the fixing flange 11 and an outer peripheral wall of the input shaft 61. Accordingly, the input shaft 61 is bearing-supported by the fixing flange 11 via the ball bearing 141.

The housing 12 is provided between an inner peripheral wall of an end portion of the fixing flange 11 and the outer peripheral wall of the input shaft 61. The housing 12 includes a housing inner cylinder portion 121, a housing plate portion 122, a housing outer cylinder portion 123, a housing flange portion 124, a housing step surface 125, a housing-side spline groove portion 127, and the like.

The housing inner cylinder portion 121 is formed in a substantially cylindrical shape. The housing plate portion 122 is formed in an annular plate shape so as to extend radially outward from an end portion of the housing inner cylinder portion 121. The housing outer cylinder portion 123 is formed in a substantially cylindrical shape so as to extend from an outer edge portion of the housing plate portion 122 to the same side as the housing inner cylinder portion 121. The housing flange portion 124 is formed in an annular plate shape so as to extend radially outward from an end portion of the housing outer cylinder portion 123 opposite to the housing plate portion 122. The housing inner cylinder portion 121, the housing plate portion 122, the housing outer cylinder portion 123, and the housing flange portion 124 are integrally formed of, for example, metal.

The housing step surface 125 is formed in a circular-annular planar shape so as to face the side opposite to the housing plate portion 122 on the radially outer side of the housing inner cylinder portion 121. The housing-side spline groove portion 127 is formed in an outer peripheral wall of the housing inner cylinder portion 121 so as to extend in an axial direction on a side opposite to the housing plate portion 122 with respect to the housing step surface 125. Multiple housing-side spline groove portions 127 are formed in a circumferential direction of the housing inner cylinder portion 121.

The housing 12 is fixed to the fixing flange 11 such that a part of outer walls of the housing plate portion 122 and the housing outer cylinder portion 123 are in contact with a wall surface of the fixing flange 11 (see FIG. 2). The housing 12 is fixed to the fixing flange 11 by a bolt or the like (not shown). The housing 12 is provided coaxially with the fixing flange 11 and the input shaft 61. A substantially cylindrical space is formed between the inner peripheral wall of the housing inner cylinder portion 121 and the outer peripheral wall of the input shaft 61.

The fixing portion 130 includes a fixing cylinder portion 131, a fixing annular portion 132, and a fixing flange portion 133. The fixing cylinder portion 131 is formed in a substantially cylindrical shape. The fixing annular portion 132 is formed in a substantially circular-annular shape so as to extend radially inward from an inner peripheral wall of the fixing cylinder portion 131. The fixing flange portion 133 is formed in a substantially circular-annular shape so as to extend radially outward from an end portion of the fixing cylinder portion 131. The fixing cylinder portion 131, the fixing annular portion 132, and the fixing flange portion 133 are integrally formed of, for example, metal. The fixing portion 130 is fixed to the housing 12 such that the fixing flange portion 133 is fixed to the housing flange portion 124 by a bolt 13.

The motor 20 includes a stator 21, a coil 22, a rotor 23, and the like. The stator 21 is formed in a substantially circular-annular shape by, for example, a laminated steel plate, and is fixed to an inside of the housing outer cylinder portion 123. The coil 22 includes a bobbin 221 and a winding 222. The bobbin 221 is formed of, for example, a resin in a cylindrical shape, and is fitted to multiple salient poles of the stator 21. The winding 222 is wound around the bobbin 221.

The rotor 23 includes a rotor cylinder portion 231, a rotor plate portion 232, a rotor cylinder portion 233, and a magnet 230. The rotor cylinder portion 231 is formed in a substantially cylindrical shape. The rotor plate portion 232 is formed in an annular plate shape so as to extend radially inward from an end portion of the rotor cylinder portion 231. The rotor cylinder portion 233 is formed in a substantially cylindrical shape so as to extend from an inner edge portion of the rotor plate portion 232 toward a side opposite to the rotor cylinder portion 231. The rotor cylinder portion 231, the rotor plate portion 232, and the rotor cylinder portion 233 are integrally formed of, for example, iron-based metal.

The magnet 230 is provided on an outer peripheral wall of the rotor cylinder portion 231. Multiple magnets 230 are provided at equal intervals in a circumferential direction of the rotor cylinder portion 231 such that the magnetic poles are alternately arranged. A ball bearing 151 is provided on an outer peripheral wall of the housing inner cylinder portion 121 on a housing plate portion 122 side with respect to the housing step surface 125. An inner peripheral wall of the ball bearing 151 is fitted to the outer peripheral wall of the housing inner cylinder portion 121. The rotor 23 is provided such that an inner peripheral wall of the rotor cylinder portion 231 is fitted to an outer peripheral wall of the ball bearing 151. Accordingly, the rotor 23 is rotatably supported by the housing inner cylinder portion 121 via the ball bearing 151.

The rotor 23 is provided so as to be rotatable relatively with respect to the stator 21 on the radially inner side of the stator 21. The motor 20 is an inner rotor type brushless DC motor.

The ECU 10 can control the operation of the motor 20 by controlling electric power supplied to the winding 222 of the coil 22. When the electric power is supplied to the coil 22, a rotating magnetic field is generated in the stator 21, and the rotor 23 rotates. Accordingly, the torque is output from the rotor 23. As described above, the motor 20 includes the stator 21 and the rotor 23 provided to be rotatable relatively with respect to the stator 21, and is capable of outputting the torque from the rotor 23 by being supplied with electric power.

In the present embodiment, the clutch device 1 includes a substrate 101, a plate 102, a sensor magnet 103, and a rotation angle sensor 104. The substrate 101 is provided on the outer peripheral wall of the housing inner cylinder portion 121 in the vicinity of the housing plate portion 122. The plate 102 is formed in, for example, a substantially cylindrical shape. An inner peripheral wall at one end of the plate 102 is fitted to an outer peripheral wall of an end portion of the rotor cylinder portion 231 opposite to the rotor plate portion 232 so as to be rotatable integrally with the rotor 23. The sensor magnet 103 is formed in a substantially circular-annular shape, and an inner peripheral wall of the sensor magnet 103 is fitted to an outer peripheral wall of the other end of the plate 102 so as to be rotatable integrally with the plate 102 and the rotor 23. The sensor magnet 103 generates a magnetic flux.

The rotation angle sensor 104 is mounted on the substrate 101 so as to face a surface of the sensor magnet 103 opposite to the rotor 23. The rotation angle sensor 104 detects a magnetic flux generated from the sensor magnet 103 and outputs a signal corresponding to the detected magnetic flux to the ECU 10. Accordingly, the ECU 10 can detect a rotation angle, a rotation speed, and the like of the rotor 23 based on the signal from the rotation angle sensor 104. The ECU 10 can calculate, based on the rotation angle, the rotation speed, and the like of the rotor 23, a relative rotation angle of a drive cam 40 with respect to the housing 12 and a driven cam 50 to be described later, relative positions of the driven cam 50 and the state changing unit 80 in the axial direction with respect to the housing 12 and the drive cam 40, and the like.

The speed reducer 30 includes a sun gear 31, planetary gears 32, a carrier 33, a first ring gear 34, a second ring gear 35, and the like.

The sun gear 31 is provided coaxially with and integrally rotatable with the rotor 23. More specifically, the sun gear 31 is formed of, for example, metal in a substantially cylindrical shape, and is fixed to the rotor 23 such that an outer peripheral wall of one end portion of the sun gear 31 is fitted to an inner peripheral wall of the rotor cylinder portion 233. The sun gear 31 has a sun gear tooth portion 311 as "tooth portion" and "external teeth". The sun gear tooth portion 311 is formed on the outer peripheral wall of the other end portion of the sun gear 31. The torque of the motor 20 is input to the sun gear 31. The sun gear 31 corresponds to an "input portion" of the speed reducer 30.

Multiple planetary gears 32 are provided along the circumferential direction of the sun gear 31, and are each capable of revolving in the circumferential direction of the sun gear 31 while rotating in a state of meshing with the sun gear 31. More specifically, the planetary gears 32 each are formed of, for example, metal in a substantially cylindrical shape, and four planetary gears 32 are provided at equal intervals in the circumferential direction of the sun gear 31 on the radially outer side of the sun gear 31. The planetary gear 32 has a planetary gear tooth portion 321 as "tooth portions" and "external teeth". The planetary gear tooth portion 321 is formed on an outer peripheral wall of the planetary gear 32 so as to be able to mesh with the sun gear tooth portion 311.

The carrier 33 rotatably supports the planetary gears 32 and is rotatable relatively with respect to the sun gear 31. More specifically, the carrier 33 is formed of, for example, metal in a substantially circular-annular shape, and is provided on the radially outer side with respect to the sun gear 31. The carrier 33 is rotatable relatively with respect to the rotor 23 and the sun gear 31.

The carrier 33 is provided with a pin 331, a needle bearing 332, and a carrier washer 333. The pin 331 is formed of, for example, metal in a substantially columnar shape, and is provided on the carrier 33 so as to pass through the inside of the planetary gear 32. The needle bearing 332 is provided between an outer peripheral wall of the pin 331 and an inner peripheral wall of the planetary gear 32. Accordingly, the planetary gear 32 is rotatably supported by the pin 331 via the needle bearing 332. The carrier washer 333 is formed of, for example, metal in an annular plate shape, and is provided between an end portion of the planetary gear 32 and the carrier 33 on the radially outer side of the pin 331. Accordingly, the planetary gears 32 can smoothly rotate relatively with respect to the carrier 33.

The first ring gear 34 has a first ring gear tooth portion 341, which is a tooth portion capable of meshing with the planetary gear 32, and is fixed to the housing 12. More specifically, the first ring gear 34 is formed of, for example, metal in a substantially circular-annular shape. The first ring gear 34 is integrally formed on an inner edge portion of the fixing annular portion 132 of the fixing portion 130. That is, the first ring gear 34 is fixed to the housing 12 via the fixing portion 130. The first ring gear 34 is provided coaxially with the housing 12, the rotor 23, and the sun gear 31. The first ring gear tooth portion 341 as the "tooth portion" and the "internal teeth" is formed on the inner edge portion of the first ring gear 34 so as to be able to mesh with one axial end portion of the planetary gear tooth portion 321 of the planetary gear 32.

The second ring gear 35 has a second ring gear tooth portion 351 which is a tooth portion capable of meshing with the planetary gear 32 and has a different number of teeth from the first ring gear tooth portion 341, and is provided so as to be integrally rotatable with the drive cam 40 to be described later. More specifically, the second ring gear 35 is formed of, for example, metal in a substantially circular-annular shape. The second ring gear 35 is provided coaxially with the housing 12, the rotor 23, and the sun gear 31. The second ring gear tooth portion 351 as the "tooth portion" and the "internal teeth" is formed on the inner edge portion of the second ring gear 35 so as to be able to mesh with the other axial end portion of the planetary gear tooth portion 321 of the planetary gear 32. In the present embodiment, the number of teeth of the second ring gear tooth portion 351 is larger than the number of teeth of the first ring gear tooth portion 341. More specifically, the number of teeth of the second ring gear tooth portion 351 is larger than the number of teeth of the first ring gear tooth portion 341 by the number obtained by multiplying 4, which is the number of the planetary gears 32, by an integer.

Since the planetary gears 32 is required to normally mesh with the first ring gear 34 and the second ring gear 35 having two different specifications at the same portion without interference, the planetary gears 32 is designed such that one or both of the first ring gear 34 and the second ring gear 35 are dislocated to keep a center distance of each gear pair constant.

With the above configuration, when the rotor 23 of the motor 20 rotates, the sun gear 31 rotates, and the planetary gears 32 each revolve in the circumferential direction of the sun gear 31 while rotating with the planetary gear tooth portion 321 of the planetary gears 32 meshing with the sun gear tooth portion 311, the first ring gear tooth portion 341, and the second ring gear tooth portion 351. Since the number of teeth of the second ring gear tooth portion 351 is larger than the number of teeth of the first ring gear tooth portion 341, the second ring gear 35 rotates relatively with respect to the first ring gear 34. Therefore, a minute differential rotation between the first ring gear 34 and the second ring gear 35 corresponding to a difference in the number of teeth between the first ring gear tooth portion 341 and the second ring gear tooth portion 351 is output as the rotation of the second ring gear 35. Accordingly, the torque from the motor 20 is reduced by the speed reducer 30 and is output from the second ring gear 35. In this way, the speed reducer 30 can reduce the torque of the motor 20 and output the reduced torque. In the present embodiment, the speed reducer 30 forms a 3k-type strange planetary gear speed reducer.

The second ring gear 35 is integrally formed with the drive cam 40 to be described later. The second ring gear 35 reduces the torque from the motor 20 and outputs the reduced torque to the drive cam 40. The second ring gear 35 corresponds to an "output portion" of the speed reducer 30.

The ball cam 2 has the drive cam 40 as a "rotation portion", the driven cam 50 as a "translation portion", and a ball 3 as a "rolling body".

The drive cam 40 includes a drive cam main body 41, a drive cam inner cylinder portion 42, a drive cam plate portion 43, a drive cam outer cylinder portion 44, drive cam grooves 400, and the like. The drive cam main body 41 is formed in a substantially circular-annular plate shape. The drive cam inner cylinder portion 42 is formed in a substantially cylindrical shape so as to extend in the axial direction from an outer edge portion of the drive cam main body 41. The drive cam plate portion 43 is formed in a substantially circular-annular plate shape so as to extend radially outward from an end portion of the drive cam inner cylinder portion 42 opposite to the drive cam main body 41. The drive cam outer cylinder portion 44 is formed in a substantially cylindrical shape so as to extend from an outer edge portion of the drive cam plate portion 43 to the same side as the drive cam inner cylinder portion 42. The drive cam main body 41, the drive cam inner cylinder portion 42, the drive cam plate portion 43, and the drive cam outer cylinder portion 44 are integrally formed of, for example, metal.

The drive cam groove 400 is formed so as to extend in the circumferential direction while being recessed from a surface of the drive cam main body 41 on a drive cam inner cylinder portion 42 side. Five drive cam grooves 400 are formed at equal intervals in the circumferential direction of the drive cam main body 41. The drive cam groove 400 is formed such that a groove bottom is inclined with respect to the surface of the drive cam main body 41 on the drive cam inner cylinder portion 42 side such that a depth decreases from one end toward the other end in the circumferential direction of the drive cam main body 41.

The drive cam 40 is provided inside the fixing portion 130 such that the drive cam main body 41 is located between the outer peripheral wall of the housing inner cylinder portion 121 and the inner peripheral wall of the sun gear 31, the drive cam plate portion 43 is located on a side opposite to the rotor 23 with respect to the carrier 33, and the drive cam outer cylinder portion 44 is located on a side opposite to the stator 21 with respect to the fixing annular portion 132 and inside the fixing cylinder portion 131. The drive cam 40 is rotatable relatively with respect to the housing 12 and the fixing portion 130.

The second ring gear 35 is integrally formed with the inner edge portion of the drive cam outer cylinder portion 44. That is, the second ring gear 35 is provided so as to be integrally rotatable with the drive cam 40 serving as the "rotation portion". Therefore, when the torque from the motor 20 is reduced by the speed reducer 30 and is output from the second ring gear 35, the drive cam 40 rotates relatively with respect to the housing 12 and the fixing portion 130. That is, when receiving the torque output from the speed reducer 30, the drive cam 40 rotates relatively with respect to the housing 12.

The driven cam 50 has a driven cam main body 51, a driven cam cylinder portion 52, a driven cam step surface 53, a cam-side spline groove portion 54, driven cam grooves 500, and the like. The driven cam main body 51 is formed in a substantially circular-annular plate shape. The driven cam cylinder portion 52 is formed in a substantially cylindrical shape so as to extend in the axial direction from an outer edge portion of the driven cam main body 51. The driven cam main body 51 and the driven cam cylinder portion 52 are integrally formed of, for example, metal.

The driven cam step surface 53 is formed in a circular-annular planar shape on the radially outer side of the driven cam cylinder portion 52 so as to face a side opposite to the driven cam main body 51. The cam-side spline groove portion 54 is formed in an inner peripheral wall of the driven cam main body 51 so as to extend in the axial direction. Multiple cam-side spline groove portions 54 are formed in the circumferential direction of the driven cam main body 51.

The driven cam 50 is provided such that the driven cam main body 51 is located on a side opposite to the housing step surface 125 with respect to the drive cam main body 41 and on an inner side of the drive cam inner cylinder portion 42, and the cam-side spline groove portion 54 is spline-coupled to the housing-side spline groove portion 127. Accordingly, the driven cam 50 is not rotatable relatively with respect to the housing 12 and is movable with respect to the housing 12 in the axial direction.

The driven cam groove 500 is formed so as to extend in the circumferential direction while being recessed from a surface of the driven cam main body 51 on a side opposite to the driven cam cylinder portion 52. Five driven cam grooves 500 are formed at equal intervals in the circumferential direction of the driven cam main body 51. The driven cam groove 500 is formed such that a groove bottom is inclined with respect to a surface of the driven cam main body 51 opposite to the driven cam cylinder portion 52 such that a depth of the driven cam groove 500 decreases from one end to the other end in the circumferential direction of the driven cam main body 51.

The drive cam groove 400 and the driven cam groove 500 are formed to have the same shape when viewed from a surface side of the drive cam main body 41 on the driven cam main body 51 side or a surface side of the driven cam main body 51 on the drive cam main body 41 side.

The ball 3 is formed in a spherical shape by, for example, metal. The balls 3 are rollably provided between five drive cam grooves 400 and five driven cam grooves 500, respectively. That is, a total of five balls 3 are provided.

In the present embodiment, the clutch device 1 includes a retainer 4. The retainer 4 is formed of, for example, metal in a substantially circular-annular plate shape, and is provided between the drive cam main body 41 and the driven cam main body 51. The retainer 4 has a hole portion having an inner diameter slightly larger than an outer diameter of the ball 3. Five hole portions are formed at equal intervals in the circumferential direction of the retainer 4. The ball 3 is provided in each of the five hole portions. Therefore, the balls 3 are held by the retainer 4, and positions of the balls 3 in the drive cam groove 400 and the driven cam groove 500 are stabilized.

As described above, the drive cam 40, the driven cam 50, and the balls 3 form the ball cam 2 as the "rolling body cam". When the drive cam 40 rotates relatively with respect to the housing 12 and the driven cam 50, the balls 3 roll respectively along the groove bottoms of the drive cam grooves 400 and the driven cam grooves 500.

As shown in FIG. 1, the balls 3 are provided on the radially inner side of the first ring gear 34 and the second ring gear 35. More specifically, the balls 3 are provided within a range in the axial direction of the first ring gear 34 and the second ring gear 35.

As described above, the drive cam groove 400 is formed such that the groove bottom thereof is inclined from one end to the other end. The driven cam groove 500 is formed such that the groove bottom thereof is inclined from one end to the other end. Therefore, when the drive cam 40 rotates relatively with respect to the housing 12 and the driven cam 50 due to the torque output from the speed reducer 30, the balls 3 roll in the drive cam grooves 400 and the driven cam grooves 500, and the driven cam 50 moves with respect to the drive cam 40 and the housing 12 in the axial direction, that is, strokes.

When the drive cam 40 rotates relatively with respect to the housing 12, the driven cam 50 moves with respect to the drive cam 40 and the housing 12 in the axial direction. The driven cam 50 does not rotate relatively with respect to the housing 12 since the cam-side spline groove portion 54 is spline-coupled to the housing-side spline groove portion 127. The drive cam 40 rotates relatively with respect to the housing 12, but does not move relatively with respect to the housing 12 in the axial direction.

In the present embodiment, the clutch device 1 includes a return spring 55, a return spring washer 56, and a C ring 57. The return spring 55 is, for example, a wave spring, and is provided between an outer peripheral wall of an end portion of the housing inner cylinder portion 121 opposite to the housing plate portion 122 and an inner peripheral wall of the driven cam cylinder portion 52. One end of the return spring 55 is in contact with an inner edge portion of a surface of the driven cam main body 51 on a driven cam cylinder portion 52 side.

The return spring washer 56 is formed of, for example, metal in a substantially circular-annular shape, and is in contact with the other end of the return spring 55 on the radially outer side of the housing inner cylinder portion 121. The C ring 57 is fixed to the outer peripheral wall of the housing inner cylinder portion 121 so as to lock a surface of the return spring washer 56 opposite to the return spring 55.

The return spring 55 has a force that extends in the axial direction. Therefore, the driven cam 50 is urged toward the drive cam main body 41 by the return spring 55 in a state where the balls 3 are sandwiched between the driven cam 50 and the drive cam 40.

The output shaft 62 includes a shaft portion 621, a plate portion 622, a cylinder portion 623, and a friction plate 624 (see FIG. 2). The shaft portion 621 is formed in a substantially cylindrical shape. The plate portion 622 is integrally formed with the shaft portion 621 so as to extend radially outward from one end of the shaft portion 621 in an annular plate shape. The cylinder portion 623 is integrally formed with the plate portion 622 so as to extend in a substantially cylindrical shape from an outer edge portion of the plate portion 622 toward a side opposite to the shaft portion 621. The friction plate 624 is formed in a substantially circular-annular plate shape, and is provided on an end surface of the plate portion 622 on a cylinder portion 623 side. The friction plate 624 is not rotatable relatively with respect to the plate portion 622.

An end portion of the input shaft 61 passes through the inside of the housing inner cylinder portion 121 and is located on a side opposite to the drive cam 40 with respect to the driven cam 50. The output shaft 62 is provided coaxially with the input shaft 61 on a side opposite to the fixing flange 11 with respect to the housing 12, that is, on a side opposite to the drive cam 40 with respect to the driven cam 50. A ball bearing 142 is provided between an inner peripheral wall of the shaft portion 621 and an outer peripheral wall of the end portion of the input shaft 61. Accordingly, the output shaft 62 is bearing-supported by the input shaft 61 via the ball bearing 142. The input shaft 61 and the output shaft 62 are rotatable relatively with respect to the housing 12.

The clutch 70 is provided between the input shaft 61 and the output shaft 62 on the inner side of the cylinder portion 623 of the output shaft 62. The clutch 70 includes an inner friction plate 71, an outer friction plate 72, and a locking portion 701. Multiple inner friction plates 71 each are formed in a substantially circular-annular plate shape, and are provided so as to be aligned in the axial direction between the input shaft 61 and the cylinder portion 623 of the output shaft 62. The inner friction plates 71 are provided such that inner edge portions thereof are spline-coupled to the outer peripheral wall of the input shaft 61. Therefore, the inner friction plates 71 are not rotatable relatively with respect to the input shaft 61 and are movable with respect to the input shaft 61 in the axial direction.

Multiple outer friction plates 72 each are formed in a substantially circular-annular plate shape, and are provided so as to be aligned in the axial direction between the input shaft 61 and the cylinder portion 623 of the output shaft 62. The inner friction plates 71 and the outer friction plates 72 are alternately arranged in the axial direction of the input shaft 61. The outer friction plates 72 are provided such that outer edge portions thereof are spline-coupled to an inner peripheral wall of the cylinder portion 623 of the output shaft 62. Therefore, the outer friction plates 72 is not rotatable relatively with respect to the output shaft 62 and is movable with respect to the output shaft 62 in the axial direction. Among the multiple outer friction plates 72, the outer friction plate 72 located closest to the friction plate 624 is contactable with the friction plate 624.

The locking portion 701 is formed in a substantially circular-annular shape, and is provided such that an outer edge portion is fitted into the inner peripheral wall of the cylinder portion 623 of the output shaft 62. The locking portion 701 can lock an outer edge portion of the outer friction plate 72 located closest to the driven cam 50 among the multiple outer friction plates 72. Therefore, the multiple outer friction plates 72 and the multiple inner friction plates 71 are prevented from coming off from the inside of the cylinder portion 623. A distance between the locking portion 701 and the friction plate 624 is larger than a sum of plate thicknesses of the multiple outer friction plates 72 and the multiple inner friction plates 71.

In an engaged state in which the multiple inner friction plates 71 and the multiple outer friction plates 72 are in contact with each other, that is, engaged with each other, a frictional force is generated between the inner friction plates 71 and the outer friction plates 72, and relative rotation between the inner friction plates 71 and the outer friction plates 72 is restricted according to a magnitude of the frictional force. On the other hand, in a disengaged state in which the multiple inner friction plates 71 and the multiple outer friction plates 72 are separated from each other, that is, are not engaged with each other, no frictional force is generated between the inner friction plates 71 and the outer friction plates 72, and the relative rotation between the inner friction plates 71 and the outer friction plates 72 is not restricted.

When the clutch 70 is in the engaged state, the torque input to the input shaft 61 is transmitted to the output shaft 62 via the clutch 70. On the other hand, when the clutch 70 is in the disengaged state, the torque input to the input shaft 61 is not transmitted to the output shaft 62.

In this way, the clutch 70 transmits the torque between the input shaft 61 and the output shaft 62. The clutch 70 allows transmission of the torque between the input shaft 61 and the output shaft 62 in the engaged state in which the clutch 70 is engaged, and interrupts the transmission of the torque between the input shaft 61 and the output shaft 62 in the disengaged state in which the clutch 70 is not engaged.

In the present embodiment, the clutch device 1 is a so-called normally open clutch device that is normally in the disengaged state.

The state changing unit 80 includes disk springs 81 as an "elastic deformation portion" and a thrust bearing 83. The state changing unit 80 includes two disk springs 81. The two disk springs 81 are provided on the radially outer side of the driven cam cylinder portion 52 and on a side opposite to the driven cam main body 51 with respect to the driven cam step surface 53 in a state where the disk springs 81 overlap each other in the axial direction.

The thrust bearing 83 is provided between the driven cam cylinder portion 52 and the disk spring 81. The thrust bearing 83 includes a roller 831, an inner ring portion 84, and an outer ring portion 85. The inner ring portion 84 includes an inner ring plate portion 841 and an inner ring cylinder portion 842. The inner ring plate portion 841 is formed in a substantially circular-annular plate shape. The inner ring cylinder portion 842 is formed in a substantially cylindrical shape so as to extend from an inner edge portion of the inner ring plate portion 841 toward one side in the axial direction. The inner ring plate portion 841 and the inner ring cylinder portion 842 are integrally formed of, for example, metal. The inner ring portion 84 is provided such that the inner ring plate portion 841 is in contact with the driven cam step surface 53, and an inner peripheral wall of the inner ring cylinder portion 842 is in contact with an outer peripheral wall of the driven cam cylinder portion 52.

The outer ring portion 85 includes an outer ring plate portion 851, an outer ring cylinder portion 852, and an outer ring cylinder portion 853. The outer ring plate portion 851 is formed in a substantially circular-annular plate shape. The outer ring cylinder portion 852 is formed in a substantially cylindrical shape so as to extend from an inner edge portion of the outer ring plate portion 851 to one side in the axial direction. The outer ring cylinder portion 853 is formed in a substantially cylindrical shape so as to extend from an outer edge portion of the outer ring plate portion 851 to the other side in the axial direction. The outer ring plate portion 851, the outer ring cylinder portion 852, and the outer ring cylinder portion 853 are integrally formed of, for example, metal. The outer ring portion 85 is provided on the radially outer side of the driven cam cylinder portion 52 on a side opposite to the driven cam step surface 53 with respect to the inner ring portion 84. The two disk springs 81 are located on the radially outer side of the outer ring cylinder portion 852.

The inner peripheral wall of the outer ring cylinder portion 852 is slidable on the outer peripheral wall of the driven cam cylinder portion 52.

The roller 831 is provided between the inner ring portion 84 and the outer ring portion 85. The roller 831 is rollable between the inner ring plate portion 841 and the outer ring plate portion 851. Accordingly, the inner ring portion 84 and the outer ring portion 85 are rotatable relatively with respect to each other.

One end in the axial direction of one disk spring 81 in the two disk springs 81, that is, an inner edge portion, is in contact with the outer ring plate portion 851. The C ring 82 serving as the "movement restriction portion" is fixed to the outer peripheral wall of the driven cam cylinder portion 52 so as to be able to lock one end in the axial direction of the other disk spring 81 of the two disk springs 81 and the end portion of the outer ring cylinder portion 852. Therefore, the two disk springs 81 and the thrust bearing 83 are prevented from coming off from the driven cam cylinder portion 52 by the C ring 82. The disk spring 81 is elastically deformable in the axial direction.

When the ball 3 is located at one end of the drive cam groove 400 and the driven cam groove 500, a distance between the drive cam 40 and the driven cam 50 is relatively small, and a gap Sp1 is formed between the clutch 70 and the other end in the axial direction of the other disk spring 81 in the two disk springs 81, that is, the outer edge portion (see FIG. 1). Therefore, the clutch 70 is in the disengaged state, and transmission of torque between the input shaft 61 and the output shaft 62 is interrupted.

When electric power is supplied to the coil 22 of the motor 20 under the control of the ECU 10, the motor 20 rotates, the torque is output from the speed reducer 30, and the drive cam 40 rotates relatively with respect to the housing 12. Accordingly, the ball 3 rolls from one end to the other end of the drive cam groove 400 and the driven cam groove 500. Therefore, the driven cam 50 moves with respect to the drive cam 40 in the axial direction, that is, moves relatively toward the clutch 70 while compressing the return spring 55. Accordingly, the disk springs 81 move toward the clutch 70.

When the disk springs 81 move toward the clutch 70 due to the movement of the driven cam 50 in the axial direction, the gap Sp1 reduces, and the other end in the axial direction of the other disk spring 81 in the two disk springs 81 comes into contact with the outer friction plate 72 of the clutch 70. When the driven cam 50 further moves in the axial direction after the disk spring 81 comes into contact with the clutch 70, the disk spring 81 presses the outer friction plate 72 toward a friction plate 624 side while being elastically deformed in the axial direction. Accordingly, the multiple inner friction plates 71 and the multiple outer friction plates 72 are engaged with each other, and the clutch 70 is brought into the engaged state. The torque transmission between the input shaft 61 and the output shaft 62 is allowed.

At this time, the two disk springs 81 rotate relatively with respect to the driven cam cylinder portion 52 together with the outer ring portion 85 of the thrust bearing 83. At this time, the roller 831 rolls between the inner ring plate portion 841 and the outer ring plate portion 851 while receiving a load in a thrust direction from the disk spring 81. The thrust bearing 83 bearing-supports the disk spring 81 while receiving the load in the thrust direction from the disk spring 81.

When a clutch transmission torque reaches a clutch required torque capacity, the ECU 10 stops the rotation of the motor 20. Accordingly, the clutch 70 is in an engagement maintaining state in which the clutch transmission torque is maintained at the clutch required torque capacity. As described above, the disk springs 81 of the state changing unit 80 receives a force in the axial direction from the driven cam 50, and can change the state of the clutch 70 to the engaged state or the disengaged state according to a relative position of the driven cam 50 in the axial direction with respect to the housing 12 and the drive cam 40.

In the output shaft 62, an end portion of the shaft portion 621 opposite to the plate portion 622 is connected to an input shaft of a transmission (not shown), and the output shaft 62 is rotatable together with the input shaft. That is, the torque output from the output shaft 62 is input to the input shaft of the transmission. The torque input to the transmission is changed in speed by the transmission, and is output to driving wheels of the vehicle as a drive torque. Accordingly, the vehicle travels.

Next, a 3k-type strange planetary gear speed reducer adopted by the speed reducer 30 according to the present embodiment will be described.

In an electric clutch device as in the present embodiment, it is required to shorten a time required for an initial response to reduce an initial gap (corresponding to the gap Sp1) between the clutch and an actuator. It can be seen from an equation of rotation motion that it is sufficient to reduce an inertia moment around the input shaft in order to speed up the initial response. The inertia moment in a case where the input shaft is a solid cylindrical member increases in proportion to a fourth power of an outer diameter when compared with constant length and density. In the clutch device 1 according to the present embodiment, the sun gear 31 corresponding to the "input shaft" here is a hollow cylindrical member, whereas a tendency does not change.

Figure 3:
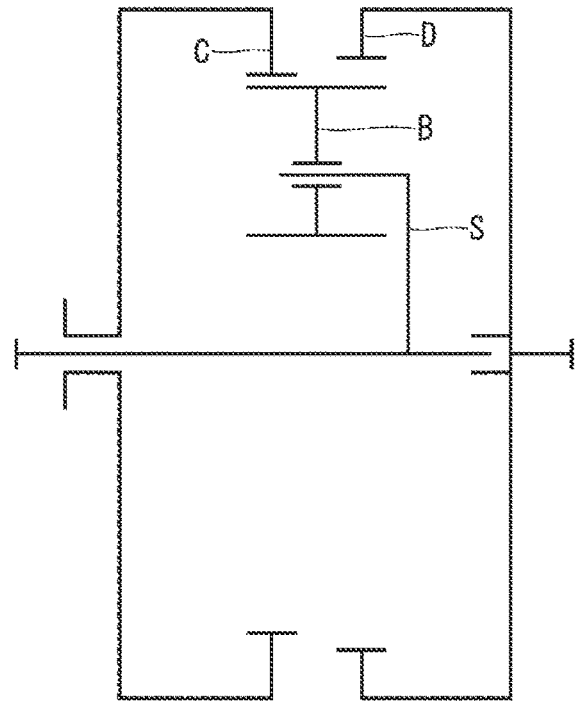
FIG. 3 is a schematic diagram of a 2kh-type strange planetary gear speed reducer, and a table showing a relationship among an input and output pattern, an inertia moment, and a speed reduction ratio.
Figure 4:
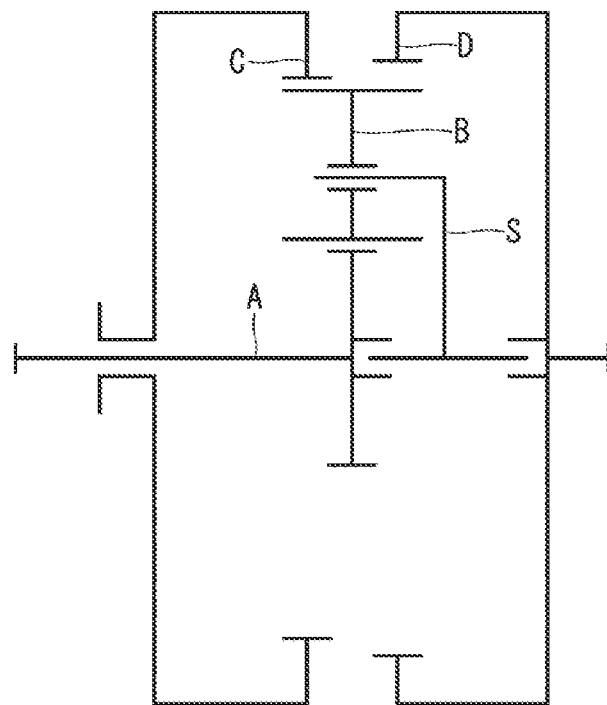
FIG. 4 is a schematic diagram of a 3k-type strange planetary gear speed reducer, and a table showing a relationship among an input and output pattern, an inertia moment, and a speed reduction ratio.

An upper part in FIG. 3 shows a schematic diagram of a 2kh-type strange planetary gear speed reducer. An upper part in FIG. 4 shows a schematic diagram of the 3k-type strange planetary gear speed reducer. The sun gear is denoted by A. The planetary gear is denoted by B. The first ring gear is denoted by C. The second ring gear is denoted by D. The carrier is denoted by S. Comparing the 2kh-type and the 3k-type, the 3k-type has a configuration in which the sun gear A is added to the 2kh-type.

In the case of the 2kh-type, the inertia moment around the input shaft is smallest when the carrier S located on a radially innermost side among constituent elements is used as an input element (see a table in a lower part of FIG. 3).

On the other hand, in the case of the 3kh-type, the inertia moment around the input shaft is smallest when the sun gear A located on the radially innermost side among the constituent elements is used as the input element (see a table in a lower part of FIG. 4).

A magnitude of the inertia moment is larger in the case where the carrier S is used as the input element in the 2kh-type than in the case where the sun gear A is used as the input element in the 3kh-type. Therefore, in the electric clutch device in which the speed of the initial response is required, when a strange planetary gear reducer is adopted as the speed reducer, it is desirable to use the 3k-type and use the sun gear A as the input element.

Further, in the electric clutch device, the required load is as large as several thousands to several tens of thousands N, and in order to achieve both a high response and a high load, it is necessary to increase a speed reduction ratio of the speed reducer. When maximum speed reduction ratios of the 2kh-type and the 3k-type are compared with each other in the same gear specification, the maximum speed reduction ratio of the 3k-type is large than and is about twice the maximum speed reduction ratio of the 2kh-type. In the case of the 3k-type, a large speed reduction ratio can be obtained when the sun gear A having the smallest inertia moment is used as an input element (see the table in the lower part of FIG. 4). Therefore, it can be said that an optimal configuration for achieving both high response and high load is a configuration in which the 3k-type is used and the sun gear A is used as the input element.

In the present embodiment, the speed reducer 30 is a 3k-type strange planetary gear speed reducer having the sun gear 31 (A) as the input element, the second ring gear 35 (D) as an output element, and the first ring gear 34 (C) as a fixing element. Therefore, the inertia moment around the sun gear 31 can be reduced, and the speed reduction ratio of the speed reducer 30 can be increased. It is possible to achieve both high response and high load in the clutch device 1.

Next, an effect of the state changing unit 80 having the disk spring 81 as the elastic deformation portion will be described.

Figure 5:
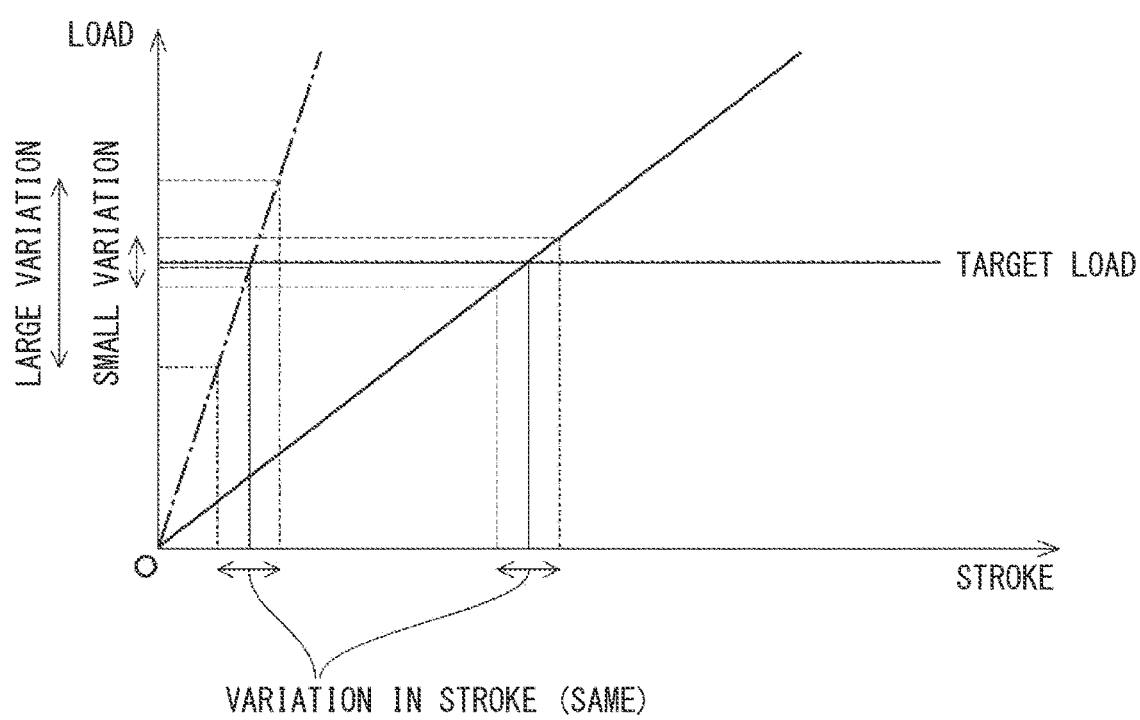
FIG. 5 is a diagram showing a relationship between a stroke of a translation portion and a load acting on a clutch.

As shown in FIG. 5, with respect to a relationship between the movement of the driven cam 50 in the axial direction, that is, a stroke and a load acting on the clutch 70, when comparing a configuration in which the clutch 70 is pushed by a rigid body that is difficult to elastically deform in the axial direction (see an alternate long and short dash line in FIG. 5) and a configuration in which the clutch 70 is pushed by the disk spring 81 that is elastically deformable in the axial direction as in the present embodiment (see a solid line in FIG. 5), it can be seen that, when variations in the stroke are the same, a variation in the load acting on the clutch 70 is smaller in the configuration in which the clutch 70 is pushed by the disk spring 81 than that in the configuration in which the clutch 70 is pushed by the rigid body. This is because, as compared with the configuration in which the clutch 70 is pushed by the rigid body, a combined spring constant can be reduced by using the disk spring 81, so that the variation in the load with respect to the variation in the stroke of the driven cam 50 caused by the actuator can be reduced. In the present embodiment, since the state changing unit 80 includes the disk spring 81 as the elastic deformation portion, the variation in the load with respect to the variation in the stroke of the driven cam 50 can be reduced, and a target load can be easily applied to the clutch 70.

Hereinafter, the configuration of each portion according to the present embodiment will be described in more detail.

In the present embodiment, the clutch device 1 includes an O-ring 401 and an O-ring 402. The O-ring 401 and the O-ring 402 are each formed in an annular shape using an elastic material such as rubber. The O-ring 401 is provided in an annular groove portion formed in the outer peripheral wall of the housing inner cylinder portion 121 between the housing-side spline groove portion 127 and the housing step surface 125. The O-ring 402 is provided in an annular groove portion formed in the outer peripheral wall of the drive cam outer cylinder portion 44. The inner peripheral wall of the drive cam main body 41 is slidable with respect to an outer edge portion of the O-ring 401. The O-ring 401 liquid-tightly seals the housing inner cylinder portion 121 and the inner peripheral wall of the drive cam main body 41. The inner peripheral wall of the fixing cylinder portion 131 is slidable with respect to the outer edge portion of the O-ring 402. The O-ring 402 liquid-tightly seals the drive cam outer cylinder portion 44 and the inner peripheral wall of the fixing cylinder portion 131. Accordingly, it is possible to prevent water, oil, dust, and the like on a side opposite to the motor 20 with respect to the drive cam 40 from entering an inside of the housing 12 in which the motor 20, the speed reducer 30, and the like are accommodated via a space between the drive cam 40 and the housing inner cylinder portion 121 or a space between the drive cam 40 and the fixing cylinder portion 131.

In the present embodiment, the clutch device 1 includes a thrust bearing 161 and a thrust bearing washer 162. The thrust bearing washer 162 is formed of, for example, metal in a substantially circular-annular plate shape, and is provided such that one surface thereof is in contact with the housing step surface 125. The thrust bearing 161 is provided between the other surface of the thrust bearing washer 162 and a surface of the drive cam main body 41 opposite to the driven cam 50. The thrust bearing 161 bearing-supports the drive cam 40 while receiving a load in the thrust direction from the drive cam 40. In the present embodiment, the load in the thrust direction acting on the drive cam 40 from the clutch 70 side via the driven cam 50 acts on the housing step surface 125 via the thrust bearing 161 and the thrust bearing washer 162. Therefore, the drive cam 40 can be stably bearing-supported by the housing step surface 125.

As shown in FIG. 1, the drive cam main body 41 is located on a side opposite to the clutch 70 with respect to surfaces of the drive cam outer cylinder portion 44 and the second ring gear 35 on the side opposite to the clutch 70. The driven cam main body 51 is located in the radially inner side of the drive cam outer cylinder portion 44, the second ring gear 35, and the drive cam inner cylinder portion 42. The sun gear tooth portion 311 of the sun gear 31, the carrier 33, and the planetary gears 32 are located on the radially outer side of the drive cam main body 41 and the driven cam main body 51. Accordingly, a size in the axial direction of the clutch device 1 including the speed reducer 30 and the ball cam 2 can be significantly reduced.

As shown in FIG. 1, in the axial direction of the drive cam main body 41, the drive cam main body 41, the sun gear 31, the carrier 33, and the bobbin 221 and the winding 222 of the coil 22 are disposed so as to partially overlap each other. In other words, the coil 22 is provided such that a part of the coil 22 is located on the radially outer side of a part of the drive cam main body 41, the sun gear 31, and the carrier 33 in the axial direction. Accordingly, the size of the clutch device 1 in the axial direction can be further reduced.

Next, the C ring 82 as the "movement restriction portion" and the like will be described in detail.

Figure 6:
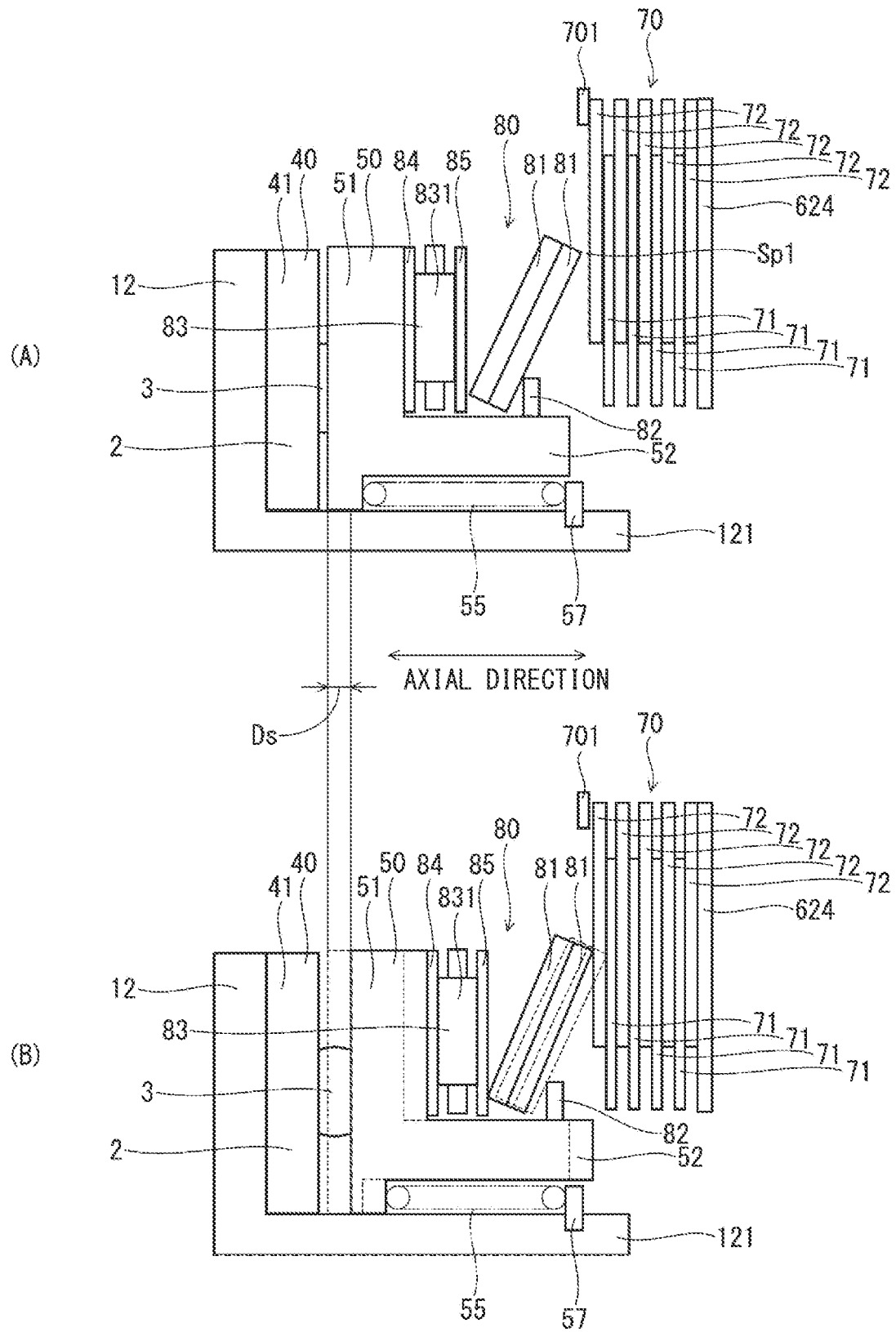
FIG. 6 is a diagram illustrating an operation of the clutch device according to the embodiment, and is a diagram showing that the clutch is shifted from a disengaged state to an engaged state.

As shown in (A) in FIG. 6, the C ring 82 is provided on the driven cam 50 so as to be located on the clutch 70 side with respect to the state changing unit 80, and can restrict the relative movement of the state changing unit 80 toward the clutch 70 with respect to the driven cam 50 when the C ring 82 is in contact with the state changing unit 80.

More specifically, the C ring 82 is formed of, for example, metal in a substantially C-shape, and is fixed to the outer peripheral wall of the driven cam cylinder portion 52 of the driven cam 50 so as to be located on the clutch 70 side with respect to the two disk springs 81 of the state changing unit 80. The C ring 82 can be in contact with an inner edge portion of the disk spring 81 on the clutch 70 side in the two disk springs 81. When the C ring 82 comes into contact with the disk spring 81, the C ring 82 can restrict the relative movement of the disk spring 81 toward the clutch 70 with respect to the driven cam 50. Accordingly, the disk springs 81 and the thrust bearing 83 are prevented from coming off from the driven cam cylinder portion 52.

In an initial state in which the ball 3 is located at one end of the drive cam groove 400 and the driven cam groove 500, a distance between the drive cam 40 and the driven cam 50 is relatively small, and the gap Sp1 is formed between the clutch 70 and an end portion in the axial direction, that is, an outer edge portion of the disk spring 81 on the clutch 70 side in the two disk springs 81 (see (A) in FIG. 6). At this time, the inner edge portion of the disk spring 81 on the clutch 70 side in the two disk springs 81 can be in contact with the C ring 82.

In the present embodiment, a predetermined clearance is formed, in the axial direction of the driven cam 50, between the state changing unit 80 and the C ring 82 or between the state changing unit 80 and the driven cam 50. More specifically, in the axial direction of the driven cam 50, a clearance as a gap is formed at least between the disk spring 81 and the C ring 82, between the disk spring 81 and the outer ring portion 85, between the outer ring portion 85 and the roller 831, between the roller 831 and the inner ring portion 84, or between the inner ring portion 84 and the driven cam 50.

When the driven cam 50 is moved toward the clutch 70 due to the operation of the motor 20, the outer edge portion of the disk spring 81 on the clutch 70 side in the two disk springs 81 comes into contact with the clutch 70. When the driven cam 50 further moves toward the clutch 70, the disk spring 81 receives a force in the axial direction from the driven cam 50 so as to be pressed against the clutch 70, and is elastically deformed such that the inner edge portion is displaced toward the clutch 70 with respect to the outer edge portion (see (B) in FIG. 6). At this time, the disk spring 81 on the clutch 70 side in the two disk springs 81 is separated from the C ring 82. Therefore, at this time, the disk spring 81 and the C ring 82 that can rotate together with the clutch 70 do not slide on each other, and wear of the members can be reliably prevented.

(B) in FIG. 6 shows the clutch 70 that is brought to the engaged state by moving the driven cam 50 in the initial state (see (A) in FIG. 6) toward the clutch 70 by a stroke distance Ds.

In the present embodiment, the return spring 55 can urge the driven cam 50 toward a side opposite to the clutch 70 with respect to the housing 12.

Figure 7:
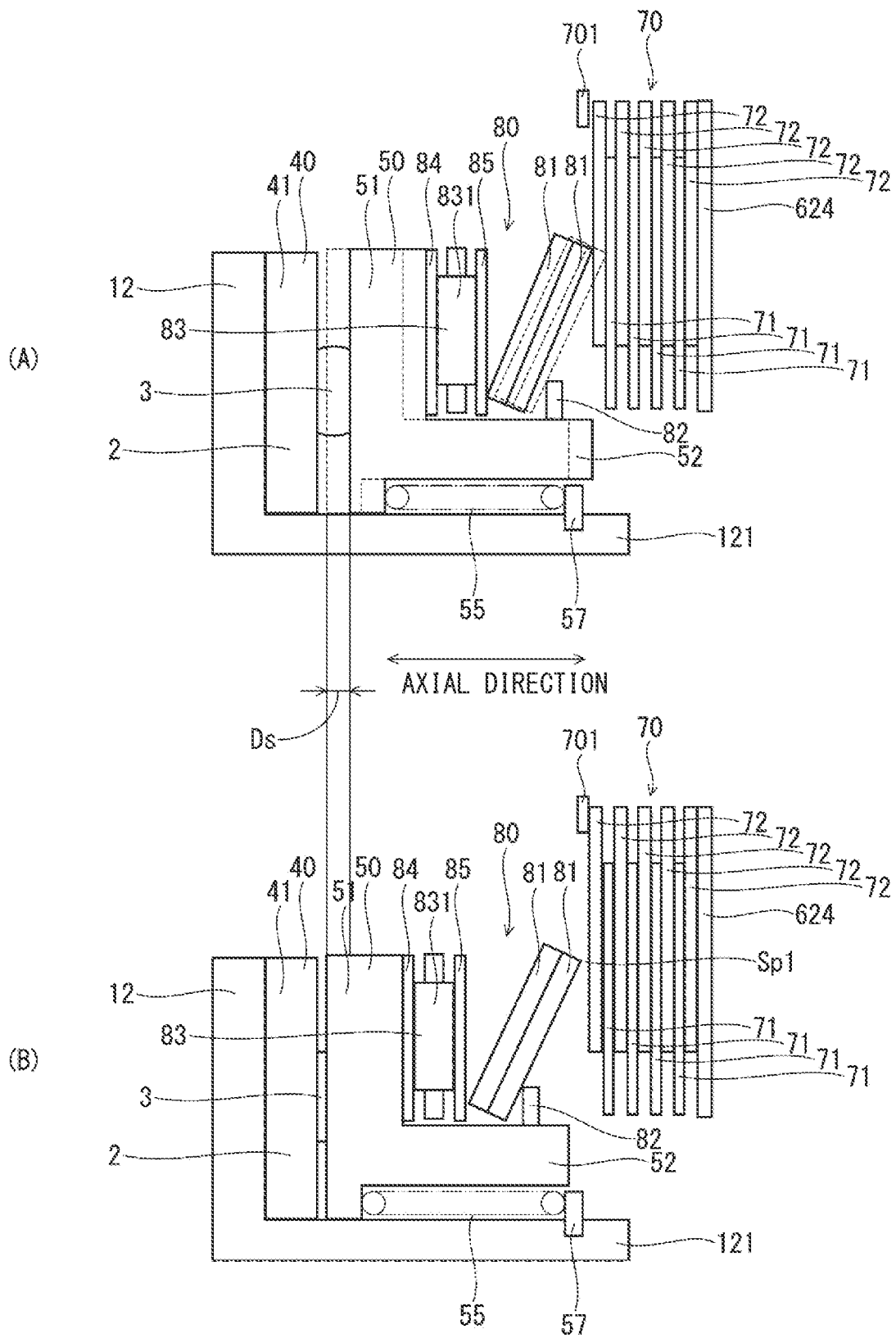
FIG. 7 is a diagram illustrating an operation of the clutch device according to the embodiment, and is a diagram showing that the clutch is shifted from the engaged state to the disengaged state.

Therefore, when the disk spring 81 of the state changing unit 80 is separated from the clutch 70 (see (A) and (B) in FIG. 7), the driven cam 50 is urged toward the side opposite to the clutch 70 with respect to the housing 12 by an urging force of the return spring 55, the disk spring 81 is locked to the C ring 82 and moves toward the side opposite to the clutch 70, and the gap Sp1 is formed between the disk spring 81 and the clutch 70. Accordingly, the disk spring 81 can be completely separated from the clutch 70 rotating at high speed. Therefore, the drag loss is reduced, and power consumption loss at the time of releasing a clutch pressing force can be reduced.

(B) in FIG. 7 shows the clutch device 1 that is brought to the initial state by moving the driven cam 50 by the stroke distance Ds to the side opposite to the clutch 70 when the clutch 70 is in the engaged state (see (A) in FIG. 7).

In the present embodiment, the motor 20, the speed reducer 30, the ball cam 2, the state changing unit 80, the C ring 82, and the return spring 55 are integrally assembled to the housing 12 to form a sub-assembly (see FIG. 1).

More specifically, an end portion of the return spring 55 on the clutch 70 side is locked to the return spring washer 56 and the C ring 57 provided on the housing 12, and an end portion of the return spring 55 on the side opposite to the clutch 70 is locked to the driven cam 50. Accordingly, components such as the driven cam 50, the balls 3, and the drive cam 40 are sub-assembled in a state of being urged toward the housing plate portion 122.

As described above, in the present embodiment, the C ring 82 as the movement restriction portion is provided on the driven cam 50 so as to be located on the clutch 70 side with respect to the state changing unit 80, and can restrict the relative movement of the state changing unit 80 toward the clutch 70 with respect to the driven cam 50 when the C ring 82 is in contact with the state changing unit 80. Therefore, when the state of the clutch 70 is shifted from the engaged state to the disengaged state due to the movement of the driven cam 50 in the direction away from the clutch 70, the movement of the state changing unit 80 toward the clutch 70 is restricted by the C ring 82, so that the clutch 70 and the state changing unit 80 can be separated from each other. Accordingly, the sliding between the rotating clutch 70 and the state changing unit 80 can be prevented, and wear of the clutch 70 and the state changing unit 80 can be prevented.

In the present embodiment, when the state of the clutch 70 is shifted from the engaged state to the disengaged state, since the clutch 70 and the state changing unit 80 can be separated from each other, the drag loss caused by the sliding between the clutch 70 and the state changing unit 80 can be prevented.

In the present embodiment, a predetermined clearance is formed, in the axial direction of the driven cam 50, between the state changing unit 80 and the C ring 82 or between the state changing unit 80 and the driven cam 50. Therefore, even if the state changing unit 80 and the C ring 82 or the state changing unit 80 and the driven cam 50 rotate relatively with respect to each other when the clutch 70 is in the engaged state, the sliding of each member can be prevented. Accordingly, wear of the members can be prevented. A design condition can be relaxed.

In the present embodiment, when the state changing unit 80 receives the force in the axial direction from the driven cam 50 and is pressed against the clutch 70, the state changing unit 80 is separated from the C ring 82. Therefore, when the clutch 70 is in the engaged state, even if the state changing unit 80 and the C ring 82 rotate relatively with respect to each other, the state changing unit 80 and the C ring 82 do not slide with respect to each other, and the wear of the members can be reliably prevented.

The present embodiment further includes the return spring 55. The return spring 55 can urge the driven cam 50 toward the side opposite to the clutch 70 with respect to the housing 12.

In the present embodiment, when the state changing unit 80 is separated from the clutch 70, the driven cam 50 is urged toward the side opposite to the clutch 70 with respect to the housing 12 by the urging force of the return spring 55, and the gap Sp1 is formed between the state changing unit 80 and the clutch 70. Accordingly, the state changing unit 80 can be completely separated from the clutch 70 rotating at high speed. Therefore, the drag loss is reduced, and power consumption loss at the time of releasing a clutch pressing force can be reduced.

In the present embodiment, the motor 20, the speed reducer 30, the ball cam 2, the state changing unit 80, the C ring 82, and the return spring 55 are integrally assembled to the housing 12 to form a sub-assembly.

In the related art, in a clutch device including a prime mover, a speed reducer, a rotational translation unit, and the like, members forming the prime mover, the speed reducer, the rotational translation unit, and the like are likely to be scattered. It is necessary to perform positioning such as meshing of each gear of the speed reducer and phase matching of each cam of the rotational translation unit at the time of assembly to a vehicle or the like, and the assembly may be difficult.

In contrast, in the present embodiment, the motor 20, the speed reducer 30, the ball cam 2, the state changing unit 80, the C ring 82, and the return spring 55 are sub-assembled. Therefore, at the time of assembly of the vehicle or the like, it is not necessary to perform the positioning such as the meshing of the gears of the speed reducer 30 and the phase matching of the cams of the ball cam 2, and the assembly can be facilitated.

In the present embodiment, the state changing unit 80 includes the disk spring 81 as an elastic deformation portion that is elastically deformable in the axial direction. Therefore, the variation in the load acting on the clutch 70 with respect to the variation in the stroke of the driven cam 50 can be reduced. Accordingly, the load control can be performed with high accuracy, and the clutch device 1 can be controlled with high accuracy.

In the present embodiment, the speed reducer 30 includes the sun gear 31, the planetary gears 32, the carrier 33, the first ring gear 34, and the second ring gear 35. The torque of the motor 20 is input to the sun gear 31. The planetary gears 32 each can revolve in the circumferential direction of the sun gear 31 while rotating in a state of meshing with the sun gear 31.

The carrier 33 rotatably supports the planetary gears 32 and is rotatable relatively with respect to the sun gear 31. The first ring gear 34 is fixed to the housing 12 and can mesh with the planetary gears 32. The second ring gear 35 is formed so as to be capable of meshing with the planetary gears 32 and such that the number of teeth of the tooth portion of the second ring gear 35 is different from that of the first ring gear 34, and outputs torque to the drive cam 40.

In the present embodiment, the speed reducer 30 corresponds to a configuration of a number of strange planetary gear reducers and a configuration of a highest response and a highest load among the input and output patterns. Therefore, both high response and high load of the speed reducer 30 can be achieved.

In the present embodiment, the motor 20 includes the stator 21 fixed to the housing 12 and the rotor 23 provided on the radially inner side of the stator 21 so as to be rotatable relatively with respect to the stator 21. That is, the motor 20 is an inner rotor type motor. The rotor 23 is provided so as to rotate integrally with the sun gear 31. Therefore, an inertia moment around the sun gear 31 provided so as to be integrally rotatable with the rotor 23 can be reduced, and response of the clutch device 1 can be increased.

In the present embodiment, the "rotation portion" of the "rotational translation unit" is the drive cam 40 having the multiple drive cam grooves 400 formed on one surface in the axial direction. The "translation portion" is the driven cam 50 having the multiple driven cam grooves 500 formed on one surface in the axial direction. The "rotational translation unit" is the ball cam 2 including the drive cam 40, the driven cam 50, and the balls 3 each provided so as to be rollable between the drive cam groove 400 and the driven cam groove 500.

Therefore, the efficiency of the "rotational translation unit" can be improved as compared with a case where the "rotational translation unit" is configured by, for example, a "sliding screw". As compared with a case where the "rotational translation unit" is configured by, for example, a "ball screw", it is possible to reduce the cost, to reduce the size of the "rotational translation unit" in the axial direction, and to further reduce the size of the clutch device.

Other Embodiments

In the above-described embodiment, an example has been described in which the predetermined clearance is formed, in the axial direction of the translation portion, between the state changing unit and the movement restriction portion or between the state changing unit and the translation portion. On the other hand, in another embodiment, a clearance may not be formed, in the axial direction of the translation portion, between the state changing unit and the movement restriction portion or between the state changing unit and the translation portion.

In the above-described embodiment, an example has been described in which the state changing unit is separated from the movement restriction portion when the state changing unit receives the force in the axial direction from the translation portion and is pressed against the clutch. On the other hand, in another embodiment, before or after the state changing unit receives the force in the axial direction from the translation portion and is pressed against the clutch, the state changing unit may be in contact with the movement restriction portion.

In another embodiment, the return spring that can urge the translation portion toward the side opposite to the clutch with respect to the housing may not be provided.

In another embodiment, the prime mover, the speed reducer, the rotational translation unit, the state changing unit, the movement restriction portion, and the return spring may not be integrally assembled to the housing.

In another embodiment, an elastic deformation portion of the state changing unit may be, for example, a coil spring, rubber, or the like as long as the elastic deformation portion is elastically deformable in the axial direction. In another embodiment, the state changing unit may not include the elastic deformation portion, and may be configured only by a rigid body.

In the above-described embodiments, the inner rotor type motor 20 in which the rotor 23 is provided on the radially inner side of the stator 21 has been described. However, in another embodiment, the motor 20 may be an outer rotor type motor in which the rotor 23 is provided on the radially outer side of the stator 21.

In the above-described embodiments, an example has been shown in which the rotational translation unit is a rolling body cam including a drive cam, a driven cam, and a rolling element. On the other hand, in another embodiment, the rotational translation unit may include, for example, a "slide screw" or a "ball screw" as long as the rotational translation unit includes a rotation portion that rotates relatively with respect to the housing and a translation portion that moves with respect to the rotation portion and the housing in the axial direction when the rotation portion rotates with respect to the housing.

In another embodiment, the number of the drive cam grooves 400 and the number of the driven cam grooves 500 are not limited to five and any number of grooves may be formed as long as the number of the drive cam grooves 400 and the number of the driven cam grooves 500 are three or more. Any number of balls 3 may be provided according to the number of the drive cam grooves 400 and the driven cam grooves 500.

The present disclosure is not limited to a vehicle that travels by drive torque from an internal combustion engine, and can be applied to an electric vehicle, a hybrid vehicle, or the like that can travel by drive torque from a motor.

In another embodiment, the torque may be input from the second transmission portion, and output from the first transmission portion via the clutch. For example, when one of the first transmission portion and the second transmission portion is non-rotatably fixed, the rotation of the other of the first transmission portion and the second transmission portion can be stopped by engaging the clutch. In this case, the clutch device can be used as a brake device.

As described above, the present disclosure is not limited to the above-described embodiments and can be implemented in a variety of embodiments without departing from the scope of the subject matter.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A clutch device comprising:
   a housing;
   a prime mover provided in the housing and capable of outputting torque;
   a speed reducer configured to reduce torque of the prime mover and output the reduced torque;
   a rotational translation unit including a rotation portion that rotates relative to the housing upon receiving an input of the torque output from the speed reducer, and a translation portion that moves relative to the housing in an axial direction in accordance with rotation of the rotation portion relative to the housing;
   a clutch provided between a first transmission portion and a second transmission portion that are rotatable relative to the housing, the clutch being configured to allow transmission of torque between the first transmission portion and the second transmission portion in an engaged state of the clutch, and interrupt the transmission of torque between the first transmission portion and the second transmission portion in a disengaged state of the clutch;
   a state changing unit provided radially outward of the translation portion and configured to
      be movable in the axial direction relative to the translation portion,
      be movable in the axial direction relative to the housing such that the state changing unit is in contact with the clutch or separated from the clutch,
      receive a force along the axial direction from the translation portion such that the state changing unit is pressed against the clutch, and
      change a state of the clutch to the engaged state or the disengaged state according to a position of the translation portion in the axial direction relative to the housing; and
   a movement restriction portion provided on the translation portion and located between the state changing unit and the clutch, and the movement restriction portion being configured to restrict movement of the state changing unit in a direction toward the clutch relative to the translation portion by the movement restriction portion contacting the state changing unit, wherein
   a predetermined clearance is formed, in the axial direction of the translation portion, between the state changing unit and the movement restriction portion in the engaged state, and
   the state changing unit is in contact with the movement restriction portion in the disengaged state.

2. The clutch device according to claim 1, wherein the state changing unit is separated from the movement restriction portion when the state changing unit is pressed against the clutch by receiving the force along the axial direction from the translation portion.

3. The clutch device according to claim 1, further comprising a return spring configured to urge the translation portion relative to the housing in a direction away from the clutch.

4. The clutch device according to claim 3, wherein when the state changing unit is separated from the clutch, the translation portion is urged relative to the housing in the direction away from the clutch by an urging force of the return spring such that a gap is formed between the state changing unit and the clutch.

5. The clutch device according to claim 3, wherein the prime mover, the speed reducer, the rotational translation unit, the state changing unit, the movement restriction portion, and the return spring are integrally assembled in the housing.

6. The clutch device according to claim 1, wherein the state changing unit includes an elastic deformation portion that is elastically deformable in the axial direction.

7. The clutch device according to claim 1, wherein the speed reducer includes
   a sun gear to which the torque of the prime mover is input,
   a planetary gear configured to revolve in a circumferential direction of the sun gear while rotating in a state of meshing with the sun gear,
   a carrier rotatably supporting the planetary gear and being rotatable relative to the sun gear,
   a first ring gear fixed to the housing and capable of meshing with the planetary gear, and
   a second ring gear capable of meshing with the planetary gear and outputting the torque to the rotation portion, the second ring gear being different from the first ring gear in number of teeth of a tooth portion.

8. The clutch device according to claim 7, wherein
   the prime mover includes a stator fixed to the housing, and a rotor provided radially inward of the stator and rotatable relative to the stator, and
   the rotor is rotatable integrally with the sun gear.

9. The clutch device according to claim 1, wherein
   the rotation portion is a drive cam having drive cam grooves formed on one surface of the rotation portion,
   the translation portion is a driven cam having driven cam grooves formed on one surface of the translation portion, and
   the rotational translation unit is a rolling body cam including the drive cam, the driven cam and rolling bodies, the rolling bodies being rollable between the drive cam grooves and the driven cam grooves.

10. A clutch device comprising:
   a housing;
   a prime mover provided in the housing and capable of outputting torque;
   a speed reducer configured to reduce torque of the prime mover and output the reduced torque;
   a rotational translation unit including a rotation portion that rotates relative to the housing upon receiving an input of the torque output from the speed reducer, and a translation portion that moves relative to the housing in an axial direction in accordance with rotation of the rotation portion relative to the housing;

a clutch provided between a first transmission portion and a second transmission portion that are rotatable relative to the housing, the clutch being configured to allow transmission of torque between the first transmission portion and the second transmission portion in an engaged state of the clutch, and interrupt the transmission of torque between the first transmission portion and the second transmission portion in a disengaged state of the clutch;

a state changing unit provided radially outward of the translation portion and configured to
- be movable in the axial direction relative to the translation portion,
- be movable in the axial direction relative to the housing such that the state changing unit is in contact with the clutch or separated from the clutch,
- receive a force along the axial direction from the translation portion such that the state changing unit is pressed against the clutch, and
- change a state of the clutch to the engaged state or the disengaged state according to a position of the translation portion in the axial direction relative to the housing;

a movement restriction portion provided on the translation portion and located between the state changing unit and the clutch, and the movement restriction portion being configured to restrict movement of the state changing unit in a direction toward the clutch relative to the translation portion by the movement restriction portion contacting the state changing unit; and a return spring configured to urge the translation portion relative to the housing in a direction away from the clutch, wherein when the state changing unit is separated from the clutch, the translation portion is urged relative to the housing in the direction away from the clutch by an urging force of the return spring such that a gap is formed between the state changing unit and the clutch.

11. A clutch device comprising:

a housing;

a prime mover provided in the housing and capable of outputting torque;

a speed reducer configured to reduce torque of the prime mover and output the reduced torque;

a rotational translation unit including a rotation portion that rotates relative to the housing upon receiving an input of the torque output from the speed reducer, and a translation portion that moves relative to the housing in an axial direction in accordance with rotation of the rotation portion relative to the housing;

a clutch provided between a first transmission portion and a second transmission portion that are rotatable relative to the housing, the clutch being configured to allow transmission of torque between the first transmission portion and the second transmission portion in an engaged state of the clutch, and interrupt the transmission of torque between the first transmission portion and the second transmission portion in a disengaged state of the clutch;

a state changing unit provided radially outward of the translation portion and configured to
- be movable in the axial direction relative to the translation portion,
- be movable in the axial direction relative to the housing such that the state changing unit is in contact with the clutch or separated from the clutch,
- receive a force along the axial direction from the translation portion such that the state changing unit is pressed against the clutch, and
- change a state of the clutch to the engaged state or the disengaged state according to a position of the translation portion in the axial direction relative to the housing; and a movement restriction portion provided on the translation portion and located between the state changing unit and the clutch, and the movement restriction portion being configured to restrict movement of the state changing unit in a direction toward the clutch relative to the translation portion by the movement restriction portion contacting the state changing unit, wherein the speed reducer includes:
- a sun gear to which the torque of the prime mover is input,
- a planetary gear configured to revolve in a circumferential direction of the sun gear while rotating in a state of meshing with the sun gear,
- a carrier rotatably supporting the planetary gear and being rotatable relative to the sun gear,
- a first ring gear fixed to the housing and capable of meshing with the planetary gear, and
- a second ring gear capable of meshing with the planetary gear and outputting the torque to the rotation portion, the second ring gear being different from the first ring gear in number of teeth of a tooth portion.

* * * * *